No. 874,325. PATENTED DEC. 17, 1907.
J. H. GILES.
PERPENDICULAR SWATH DIVIDER ATTACHMENT.
APPLICATION FILED MAY 10, 1904.

Witnesses
Frank B. Hoffman
C. C. Hines

Inventor:
Jesse H. Giles,
By Evans, Wilkens & Co.
Attorneys

UNITED STATES PATENT OFFICE.

JESSE H. GILES, OF SALT LAKE CITY, UTAH.

PERPENDICULAR SWATH-DIVIDER ATTACHMENT.

No. 874,325.  Specification of Letters Patent.  Patented Dec. 17, 1907.

Application filed May 10, 1904. Serial No. 207,294.

*To all whom it may concern:*

Be it known that I, JESSE H. GILES, a citizen of the United States, residing at Salt Lake City, in the county of Salt Lake and State of Utah, have invented a new and useful Perpendicular Swath-Divider Attachment, of which the following is a specification.

My invention is a device for improving the operation of and increasing the efficiency of mowing machines and reapers and consists essentially of an attachment for these machines having the office of swath divider.

Figure 1:
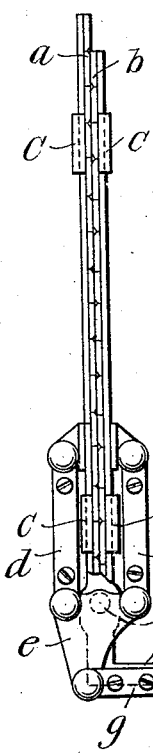
Figure 2:
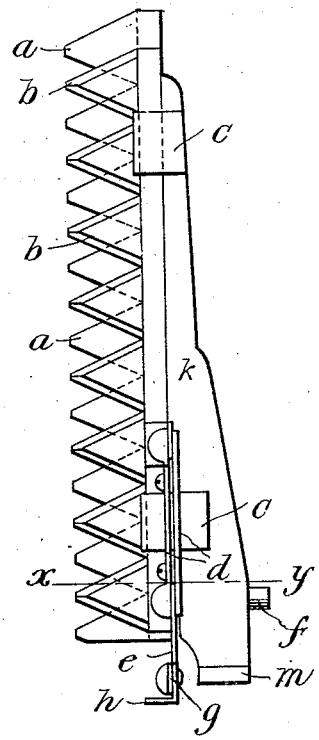
Figure 3:
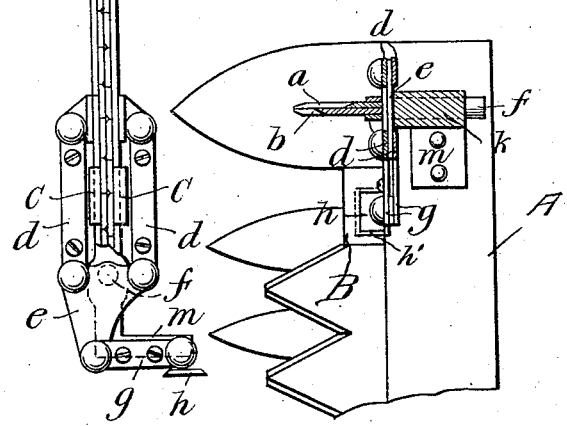
Figure 4:
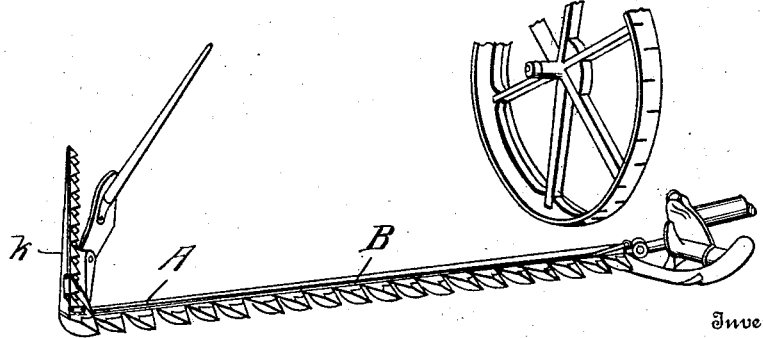

It consists of the appliances and parts more fully described below and illustrated in the accompanying drawings, in which, Figure 1 shows a front view of the attachment; Fig. 2 shows a side view of the same; Fig. 3 is a horizontal section of the attachment on the plane indicated by line X—Y of Fig. 2, showing the application of the device to the finger and cutter-bars; and Fig. 4 is a perspective of a mowing machine cutter showing the attachment in its designed position.

In Figs. 1, 2, and 3, $a$ and $b$ are cutter knives of the usual construction which are made to move up and down in close contact with each other and with an opposite motion, $a$ moving up as $b$ moves down and vice-versa.

$c$, $c$ are guides holding the knife bars in place and are firmly attached to the stiff upright $k$. The knife bars are connected by the links $d$, $d$, with the rocking plate $e$, which moves about the pivot $f$. The lower end of the rocking plate $e$ is connected by means of the link $g$ with the small shoe $h$. This small shoe $h$ fits into a proper socket $h'$ in the main knife or cutter bar A of the mower. The stiff upright $k$ is firmly bolted to the outer end of the finger bar B of the mower by means of the shoe $m$.

In operation the to-and-fro movement of the main knife bar of the mower is transmitted by shoe $h$ and link $g$ to the lower end of the rocking plate $e$. This rocks about its pivot $f$ and communicates through the links $d$, $d$, an up and down motion to the knives $a$ and $b$.

The above description and the drawings have to do with the device attached to a common mower but I am not to be understood as limiting its use to this particular form of machine as it is equally well adapted for use with reapers, binders and all forms of machines cutting hay, grain, etc. by a reciprocating cutter.

This being an improvement in swath dividers and possessing new features never before used, I claim:

The combination with the knife-bar of a mower, said bar being formed with a socket, of a plurality of knives supported for reverse movement in contact, a rocking plate, links connecting the plate and knives, a shoe seating in the socket in the knife-bar, and a link connecting the shoe and plate.

In testimony whereof I have signed my name to this specification in the presence of two subscribing witnesses.

JESSE H. GILES.

Witnesses:
  ROBT. F. MILLER,
  J. T. STRINGER.